US011676450B2

(12) United States Patent
Malek

(10) Patent No.: US 11,676,450 B2
(45) **Date of Patent: *Jun. 13, 2023**

(54) SYSTEM AND METHOD OF CONDUCTING GAMES OF CHANCE WITH ENHANCED PAYOUTS BASED ON CASH IN AMOUNT

(71) Applicant: Sean Malek, Las Vegas, NV (US)

(72) Inventor: Sean Malek, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/463,531

(22) Filed: Aug. 31, 2021

(65) Prior Publication Data

US 2021/0398389 A1 Dec. 23, 2021

Related U.S. Application Data

(63) Continuation of application No. 16/667,516, filed on Oct. 29, 2019, now Pat. No. 11,107,317, which is a continuation of application No. 16/051,308, filed on Jul. 31, 2018, now Pat. No. 10,460,559, which is a continuation of application No. 15/680,172, filed on Aug. 17, 2017, now Pat. No. 10,037,655, which is a continuation of application No. 15/207,487, filed on Jul. 11, 2016, now Pat. No. 9,741,203, which is a continuation-in-part of application No. 14/946,735, filed on Nov. 19, 2015, now Pat. No. 9,390,583, which is a continuation of application No. 14/702,701, filed on May 2, 2015, now Pat. No.
(Continued)

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/42*** | (2006.01) |

(52) U.S. Cl.
CPC ........ *G07F 17/3239* (2013.01); *G07F 17/323* (2013.01); *G07F 17/326* (2013.01); *G07F 17/3209* (2013.01); *G07F 17/3211* (2013.01); *G07F 17/3216* (2013.01); *G07F 17/3241* (2013.01); *G07F 17/3244* (2013.01); *G07F 17/3246* (2013.01); *G07F 17/3255* (2013.01); *G07F 17/3269* (2013.01); *G07F 17/3272* (2013.01); *G07F 17/3293* (2013.01); *G07F 17/42* (2013.01)

(58) Field of Classification Search
CPC ............................ G07F 17/32; G07F 17/3214
USPC ...................... 463/13, 16, 20, 21, 22, 24, 25
See application file for complete search history.

(56) References Cited

U.S. PATENT DOCUMENTS

2008/0009344 A1* 1/2008 Graham .............. G07F 17/3239 463/16
2009/0055205 A1* 2/2009 Nguyen .............. G07F 17/3241 348/169

* cited by examiner

*Primary Examiner* — Adetokunbo O Torimiro
(74) *Attorney, Agent, or Firm* — Newman Law, LLC

(57) ABSTRACT

A system and method of providing a player loyalty program to award a player of an electronic gaming machine, including conducting games with enhanced payouts based on a cash in or initial investment amount. In response to a player's initial investment or cash in amount, a payout schedule is selected. The larger the initial investment the better the selected payout schedule for the player. Live games facilitated by electronic gaming machines or devices and server-based games may utilize the method disclosed herein. Players may also receive enhanced awards such as enhanced player points based on the amount of the initial investment. Awards and bonuses may also be provided to players who exhaust an initial investment exceeding a threshold amount.

20 Claims, 9 Drawing Sheets

Related U.S. Application Data

9,202,341, which is a continuation-in-part of application No. 14/465,670, filed on Aug. 21, 2014, now Pat. No. 9,022,858, which is a continuation-in-part of application No. 14/096,140, filed on Dec. 4, 2013, now Pat. No. 9,070,256, and a continuation of application No. 12/050,768, filed on Mar. 18, 2008, now Pat. No. 8,641,514, and a continuation-in-part of application No. 12/050,768, filed on Mar. 18, 2008, now Pat. No. 8,641,514, which is a continuation-in-part of application No. 11/688,111, filed on Mar. 19, 2007, now abandoned.

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Of A Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

165

*FIG. 2A*

PRIOR ART-Jacks or Better

| Hand | 1 Credit | 2 Credits | 3 Credits | 4 Credits | 5 Credits |
|---|---|---|---|---|---|
| Natural Royal Flush | 300 | 600 | 900 | 1200 | 4000 |
| Four Deuces | 200 | 400 | 600 | 800 | 1000 |
| Wild Royal Flush | 25 | 50 | 75 | 100 | 125 |
| Five Of A Kind | 15 | 30 | 45 | 60 | 75 |
| Straight Flush | 9 | 18 | 27 | 36 | 45 |
| Four Of A Kind | 5 | 10 | 15 | 20 | 25 |
| Full House | 3 | 6 | 9 | 12 | 15 |
| Flush | 2 | 4 | 6 | 8 | 10 |
| Straight | 2 | 4 | 6 | 8 | 10 |
| Three Of A Kind | 1 | 2 | 3 | 4 | 5 |

170

*FIG. 2B*

PRIOR ART-Deuces Wild

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces | 160 | 320 | 480 | 640 | 800 |
| Full House | 10 | 20 | 30 | 40 | 50 |
| Flush | 7 | 14 | 21 | 28 | 35 |
| Straight | 5 | 10 | 15 | 20 | 25 |
| Three Of A Kind | 3 | 6 | 9 | 12 | 15 |
| Two Pair | 1 | 2 | 3 | 4 | 5 |
| Jacks Or Better | 1 | 2 | 3 | 4 | 5 |

175

*FIG. 2C*

PRIOR ART-Double Bonus

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces w/2,3, or 4 | 400 | 800 | 1200 | 1600 | 2000 |
| Four 2,3, or 4 w/A-4 | 160 | 320 | 480 | 640 | 800 |
| Four Aces | 160 | 320 | 480 | 640 | 800 |
| Four 2,3, or 4 | 80 | 160 | 240 | 320 | 400 |
| Four 5-K | 50 | 100 | 150 | 200 | 250 |
| Full House | 10 | 20 | 30 | 40 | 50 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 1 | 2 | 3 | 4 | 5 |
| Jacks Or Better | 1 | 2 | 3 | 4 | 5 |

180

*FIG. 2D*

PRIOR ART-Double Double Bonus

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Aces | 80 | 160 | 240 | 320 | 400 |
| Four 2,3, or 4 | 40 | 80 | 120 | 160 | 200 |
| Four 5-K | 25 | 50 | 75 | 100 | 125 |
| Full House | 7 | 14 | 21 | 28 | 35 |
| Flush | 5 | 10 | 15 | 20 | 25 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

185

PRIOR ART-5/7 Bonus Poker

| Hand | 1 Credit | 2 Credits | 3 Credits | 4 Credits | 5 Credits |
|---|---|---|---|---|---|
| Royal Flush | 250 | 500 | 750 | 1000 | 4000 |
| Straight Flush | 50 | 100 | 150 | 200 | 250 |
| Four Of A Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

200

FIG. 3A
(≤$50.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 45 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

205

FIG. 3B
($50.25 to $100.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 75 |
| Flush | 6 | 12 | 18 | 24 | 30 |
| Straight | 4 | 8 | 12 | 16 | 20 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

210

*FIG. 3C*

($100.25 to $200.00)

| Hand | 1 Credit | 2 Credits | 3 Credits | 4 Credits | 5 Credits |
|---|---|---|---|---|---|
| Royal Flush | 250 | 500 | 750 | 1000 | 4250 |
| Straight Flush | 50 | 100 | 150 | 200 | 300 |
| Four Of A Kind | 25 | 50 | 75 | 100 | 175 |
| Full House | 9 | 18 | 27 | 36 | 75 |
| Flush | 6 | 12 | 18 | 24 | 40 |
| Straight | 4 | 8 | 12 | 16 | 25 |
| Three Of A Kind | 3 | 6 | 9 | 12 | 15 |
| Two Pair | 2 | 4 | 6 | 8 | 10 |
| Jacks Or Better | 1 | 2 | 3 | 4 | 5 |

215

*FIG. 3D*

(>$200.00)

SYSTEM AND METHOD OF CONDUCTING GAMES OF CHANCE WITH ENHANCED PAYOUTS BASED ON CASH IN AMOUNT

RELATED APPLICATIONS

This application is a continuation of U.S. patent application Ser. No. 16/667,516 filed Oct. 29, 2019, which is a continuation of U.S. patent application Ser. No. 15/680,172 filed on Aug. 17, 2017 and issued as U.S. Pat. No. 10,037,655 on Jul. 31, 2018, which is a continuation of U.S. patent application Ser. No. 12/050,768 filed on Mar. 18, 2008 and issued as U.S. Pat. No. 8,641,514 on Feb. 4, 2014, which is a continuation-in-part application of U.S. patent application Ser. No. 11/688,111 filed on Mar. 19, 2007. This application is related and claims priority to U.S. patent application Ser. No. 12/050,768 through presently pending U.S. patent application Ser. No. 15/207,187 filed on Jul. 17, 2016, which claims priority as a Continuation-in-part of U.S. patent application Ser. No. 14/946,735 filed on Nov. 19, 2015 and issued as U.S. Pat. No. 9,390,583 on Jul. 12, 2016, which is a Continuation of U.S. patent application Ser. No. 14/702,701 filed on May 2, 2015 and issued as U.S. Pat. No. 9,202,341 on Dec. 1, 2015, which is a Continuation-in-part of U.S. patent application Ser. No. 14/465,670 filed on Aug. 21, 2014 and issued as U.S. Pat. No. 9,022,858 on May 5, 2015, which is a Continuation-in-part of U.S. patent application Ser. No. 14/096,140 filed on Dec. 4, 2013 and issued as U.S. Pat. No. 9,070,256 on Jun. 30, 2015, which is a continuation-in-part application of U.S. patent application Ser. No. 12/050,768 filed on Mar. 18, 2008 and issued as U.S. Pat. No. 8,641,514 on Feb. 4, 2014, which is a continuation-in-part application of U.S. patent application Ser. No. 11/688,111 filed on Mar. 19, 2007.

FIELD OF THE INVENTION

The embodiments of the present invention relate to a system and method of enhancing conventional game payouts based on a cash in amount or initial investment in a game of chance.

BACKGROUND

Casinos are a mix of electronic gaming machines (e.g., slot machines) and live casino games (e.g., craps). Each game of chance has a corresponding pay table or payout schedule which provides the house or casino with an edge. Some games, such as video poker and slots, provide enhanced payouts when players play maximum coins. For example, a player playing five coins in video poker will be paid 4000 coins for a Royal Flush while the player will only receive 1600 coins if four coins are played. Similarly, with Megabucks slot machines, only players playing maximum coins are eligible for the multi-million dollar jackpot. While such enhancements have been popular, they are not useful with all games of chance and they force the player to play more coins per game than they want to play.

Therefore, it would be advantageous to provide a system and method of providing enhanced payouts for all games of chance. Moreover, the system and method should not require the player to wager any additional amounts on a per game basis.

SUMMARY

Accordingly, a first embodiment of the present invention is a method comprising: accepting an initial investment from one or more players to participate in a game; if the game is facilitated by an electronic gaming machine, crediting the machine an amount equivalent to the initial investment; if the game of chance is a live game, providing said one or more players with gaming chips equivalent to the initial investment; and selecting a payout schedule from a plurality of payout schedules wherein the payout schedules forming the plurality of payout schedules provide enhanced overall player payouts as an amount of the initial investment increases.

One gaming system embodiment of the present invention, including one or more electronic gaming machines having a processor, display and user interface, comprises: means for accepting an initial investment from a player to participate in a game of chance facilitated by an electronic gaming machine; crediting the machine an amount equivalent to the initial investment; and means for selecting a payout schedule from a plurality of payout schedules wherein the payout schedules forming the plurality of payout schedules provide enhanced overall player payouts as an amount of the initial investment increases.

The embodiments of the present invention provide players with enhanced payouts while possibly increasing a casino's bottom line. While players are not obligated to play the entirety of their initial investment (or cash in), some players tend to play longer with credits and gaming chips than they would if they were forced subsequently to cash in more money or travel to the ATM or cashier.

Another method embodiment comprises: accepting an initial investment from a player to participate in a game of chance; if the game of chance is facilitated by an electronic gaming machine, crediting said player on the machine an amount equivalent to the initial investment; if the game of chance is a live game of chance, providing said player with gaming chips equivalent to the initial investment; and if said initial investment is exhausted and exceeds a minimum initial investment threshold amount, providing a player with a bonus.

Another gaming system including one or more electronic gaming machines each having a processor, display and user interface comprises: means for accepting an initial investment from a player to participate in a game of chance facilitated by an electronic gaming machine; crediting the electronic gaming machine an amount equivalent to the initial investment; and means for providing a player with a bonus if said initial investment exceeds a minimum initial investment threshold amount and is exhausted.

In this embodiment of the present invention, players are provided with a bonus or award for exhausting an initial investment amount which exceeds a minimum threshold amount. The bonus may be free plays or anything else of value.

Other variations, embodiments and features of the present invention will become evident from the following detailed description, drawings and claims.

BRIEF DESCRIPTION OF THE DRAWINGS

FIGS. 2*a*-2*e* illustrate four conventional video poker pay tables;

FIGS. 3*a*-3*d* illustrate an exemplary group of pay tables according to the embodiments of the present invention;

FIG. 7 illustrates a flow chart detailing a methodology associated with an embodiment of the present invention utilized with live games of chance.

DETAILED DESCRIPTION

Figure 1:
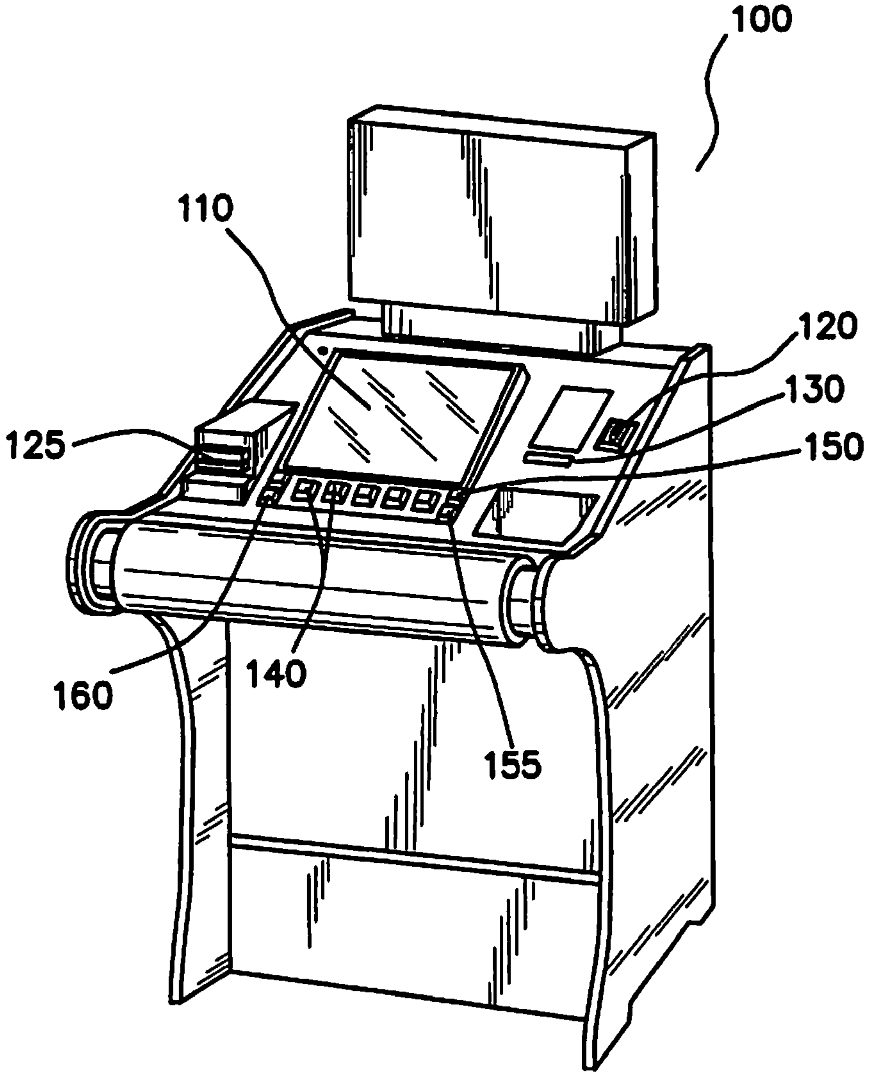
FIG. 1 illustrates a conventional video poker machine.

For the purpose of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would normally occur to one skilled in the relevant art and having possession of this disclosure, are to be considered within the scope of the invention claimed.

The operation of slot machines, video poker machines, keno machines and other electronic gaming devices is controlled by microprocessors which communicate with internal memory devices and the external features of the machines. The microprocessors also incorporate, or communicate with, a random number generator which ensures the randomness of the machines' outcomes. In one of the embodiments of the present invention, one or more processors, along with memory and related devices, control the new applications disclosed herein. Therefore, the embodiments, along with the corresponding odds, of the present invention may be programmed into the processor or associated software. Since the technology for operating and controlling electronic gaming machines is well known to those skilled in the art, the subtle details are not described herein.

In one specific example, video poker machines and devices have been in existence for many years. Video poker machines utilize a processor that randomly organizes a deck of simulated cards. Once a wager is placed, the order of the cards is set. Cards are then provided to the player in order off the top of the simulated deck. Reference is now made to the figures wherein like parts are referred to by like numerals throughout. FIG. 1 illustrates an exemplary video poker machine generally referred to by reference numeral 100. The machine 100 includes a display 110, coin input 120, card reader 125, bill or coupon acceptor 130 and interface buttons, including hold/discard buttons 140, deal/draw button 150, play max coins button 155 and cash out button 160. In lieu of, or in addition to, all operations achieved using the interface buttons may be accomplished via touch screen implementation.

FIGS. 2*a*-2*e* show conventional pay tables for various video poker games currently played in casinos. The pay tables 165-185 correspond to Jacks or Better, Deuces Wild, Double Bonus Poker, Double Double Bonus Poker and 5/7 Bonus Poker video poker games. The payout schemes are substantially similar with subtle nuances. Each pay table comprises payouts relative to 1 to 5 coins being played. In almost every instance the payouts have a direct relationship to the number of coins played. So, if two coins are played the payout is twice that of the same payout for one coin being played and if four coins are played the payout is four times that of same payout for one coin being played. However, each pay table provides an enhanced payout for a player having five coins (i.e., maximum coins) being played and obtaining a Royal Flush. In such instances, the payout is not five times that of the same payout for one coin being played but is 10 times. Therefore, many players play five coins because they want the enhanced payout if they hit the Royal Flush. Of course, the odds of hitting a Royal Flush are small at approximately 1 in 40,000.

The embodiments of the present invention provide players with enhanced payouts based on the amount of their cash-in or initial investment in a game of chance. That is, the amount of money (or coupons, tickets or the like) a player places into the video poker machine to initiate play influences payouts. Using video poker as an example, FIGS. 3*a*-3*d* show four unique Jacks of Better pay tables 200-215 corresponding to four different ranges of cash-in amounts associated with a quarter machine. Similar enhanced payout schedules may be generated for other video poker variations (e.g., Deuces Wild) as well. Pay table 200 corresponds to a conventional Jacks or Better pay table used in response to a player cashing in for $50 or less. Pay table 205 is used for cash-in amounts ranging between $50.25 and $100.00 and provides enhanced payouts for Royal Flush, Straight Flush and Four of a Kind outcomes with 5 coins played. Pay table 210 is used for cash-in amounts ranging between $100.25 and $200.00 and provides enhanced payouts for Royal Flush, Straight Flush, Four of a Kind and Full House outcomes with five coins played. Pay table 215 is used for cash-in amounts exceeding $200.00 and provides enhanced payouts for Royal Flush, Straight Flush, Four of a Kind, Full House, Flush and Straight outcomes with five coins played. Those skilled in the art will recognize that enhanced payouts may be generated for any winning outcomes, with any amount of coins played, and the enhancements may be manipulated in any manner desired. For example, the Royal Flush payout may be enhanced to 4100 coins, rather than 4250 coins. Regardless of the pay table, the house or casino should have a suitable edge. Also, it is possible that some payouts related to specific outcomes may be reduced while others are increased. Ideally, the overall payouts related to higher cash-in amounts are greater for the player. In other words, a player has a greater chance of winning or receives a greater return with each enhanced pay table or schedule.

Figure 4:
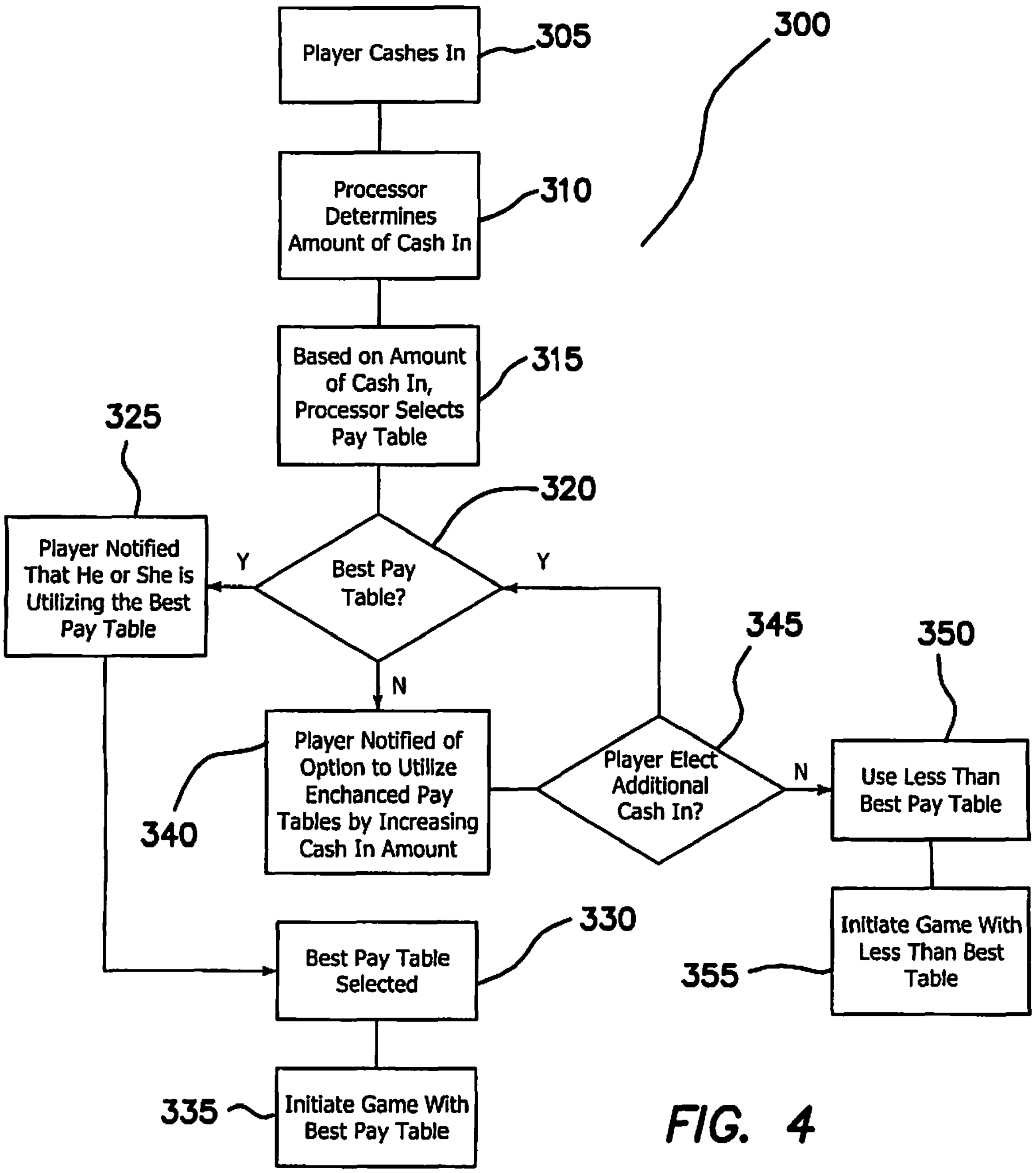
FIG. 4 illustrates a flow chart detailing a methodology associated with an embodiment of the present invention utilized with games of chance facilitated by electronic gaming machines.

FIG. 4 shows a flow chart 300 detailing one embodiment of the present as utilized with an electronic gaming machine or device. Initially, at 305, a player cashes in by inserting currency, coupons or tickets into the machine. At 310, the processor determines the amount of the cash-in and based on the amount of the cash in, at 315, selects a corresponding pay table. At 320, the processor determines if the selected pay table is the best table available for the player. The best pay table means a pay table providing the best overall payout percentage for the player. In other words, the best pay table gives the player the best chance to win. Optionally, at 325, the processor causes the player to receive notification that the best pay table will be in play. At 330, the best table is selected and then, at 335, the game is initiated with the best pay table. If at 320, the best pay table is not to be selected, at 340, the player is prompted to insert additional money to change the current pay table to one with better player payouts. The prompt indicates how much money must be input to utilize one or more pay tables having enhanced payouts over the current pay table. If, at 345, the player declines to insert any additional money, at 350, the current pay table is selected and, at 355, the game is initiated using the selected pay table. If, at 345, the player inserts additional money, a new pay table, which may be the best table or not, is selected, and, at 360, the game is initiated with the selected pay table. The selected pay table remains in effect until the player cashes out the gaming session.

Depending on the casino, players may be permitted to change the pay table as often as possible by cashing out and cashing in regularly or the system may include restrictions such that players may have limited access to enhanced pay tables. For example, players may only be permitted to utilize the enhanced pay tables once per 24 hour period or other pre-determined time period or may only have access one certain days of the week or via invitation. Casino player tracking systems or the like may be responsible for maintaining information related to the number of times that a player has utilized the enhanced payout schedules.

Figure 5:
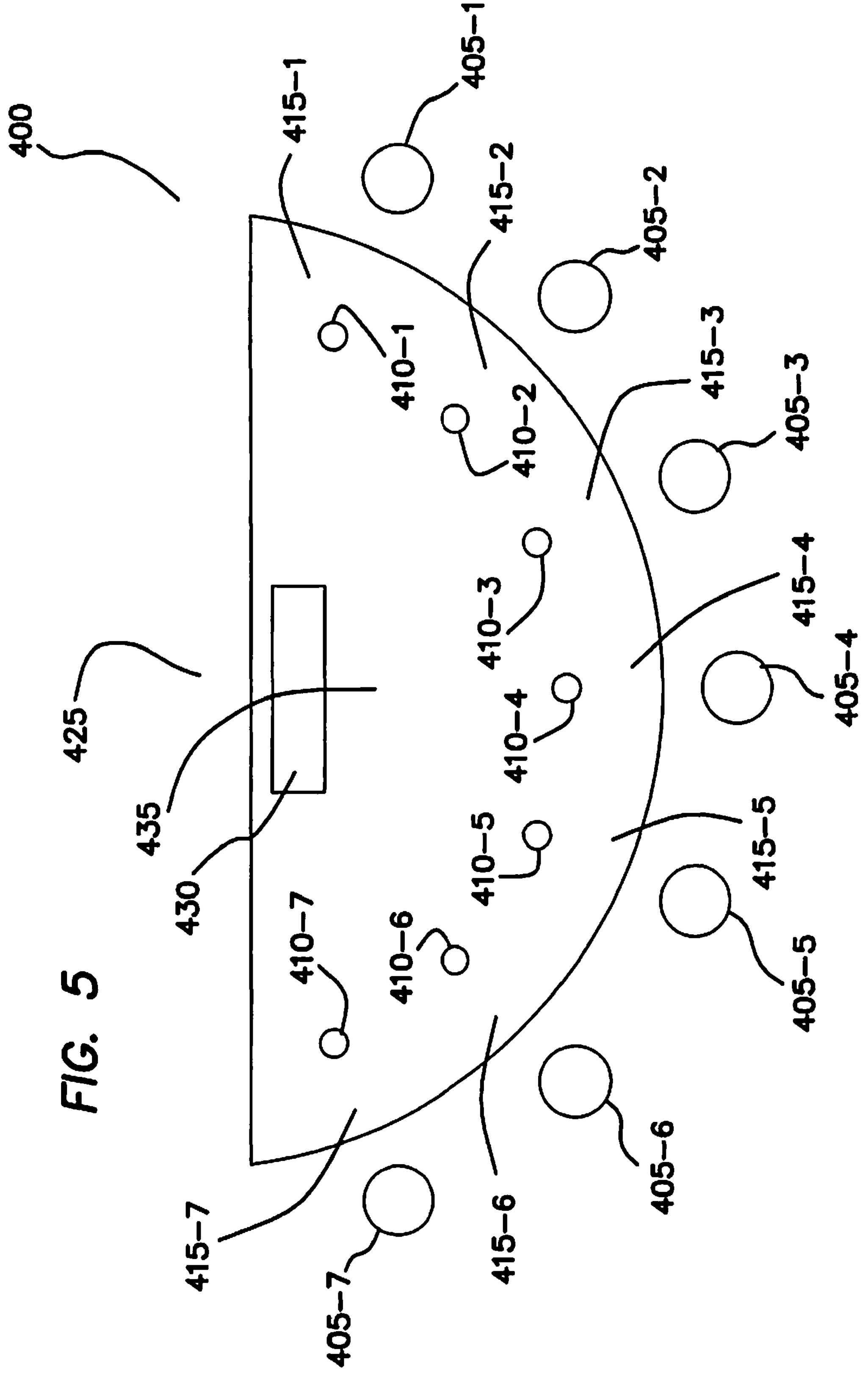
FIG. 5 illustrates a conventional blackjack layout.

FIG. 5 shows a blackjack layout 400. The blackjack layout 400 accommodates seven player positions 405-1 through 405-7, seven player wager areas 410-1 through 410-7, seven player card areas 415-1 through 415-7, a dealer position 425, chip rack 430 and dealer card area 435. The blackjack table supporting the blackjack layout 400 may also support a card shoe and card shuffler. With conventional blackjack using six to eight decks winning wagers typically pay even money and 3 to 2 on a two card 21 (i.e., "Blackjack"). Because of the prevalence of card counting, when one or two decks of cards is used to play blackjack, many casinos now lower the Blackjack payout to even money as well.

Figure 6:
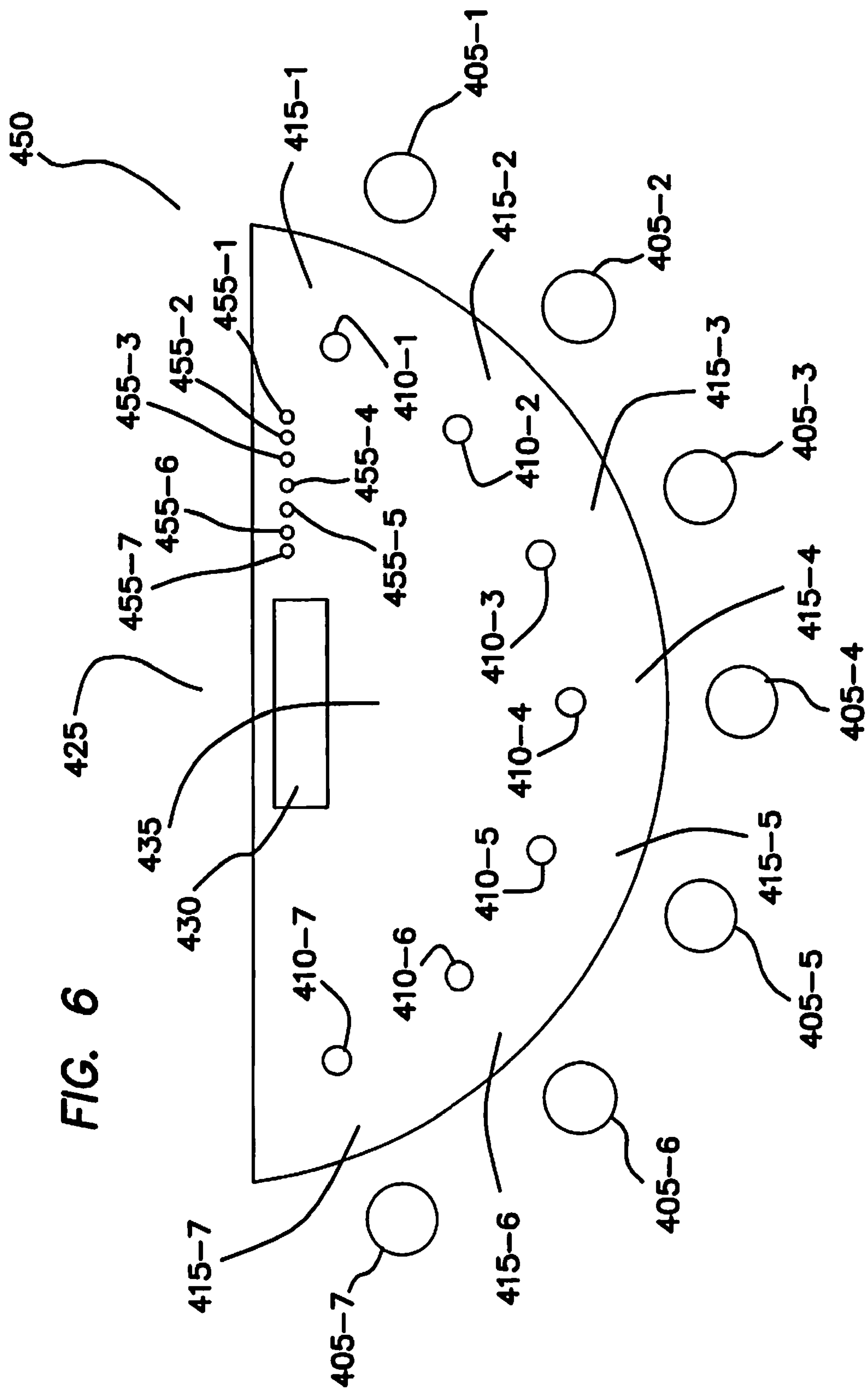
FIG. 6 illustrates an exemplary blackjack layout according to the embodiments of the present invention.

FIG. 6 shows a slightly modified blackjack layout 450 corresponding to the embodiments of the present invention. The modification to the layout 450 comprises player-corresponding circles 455 adjacent to the dealer position 425. The circles 455 provide a location for placement of payout indicators for each player position. Like the embodiment set forth above with respect to electronic gaming machines, the payouts are enhanced depending on the amount of money cashed in by each player. To track the payouts for each player, the dealer utilizes different payout chips indicative of a player's initial investment. So, with a two tiered payout structure a white chip may correspond to a conventional payout and a red chip may correspond to an enhanced payout. An electronic system may also be utilized to track which payouts correspond to which players. For example, most casinos have player tracking systems with monitors installed at most live games of chance which can be used as a reference by the dealer to maintain payout schedules for each player. With blackjack, for example, a larger initial investment, may result in a 3.5 to 1 payout on Blackjacks rather than 3 to 2 or even money. Other payouts, including payouts corresponding to even money wagers, double downs and split hands, may also be enhanced. While not shown, the unique pay tables may be printed on the layout so that players are able to immediately determine the pay table they want to play.

While blackjack is detailed above, other live table games, including Let It Ride and Caribbean Stud Poker, which have pay tables dedicated to low probability poker hands, may also utilize the embodiments of the present invention.

Figures 2E, 7:
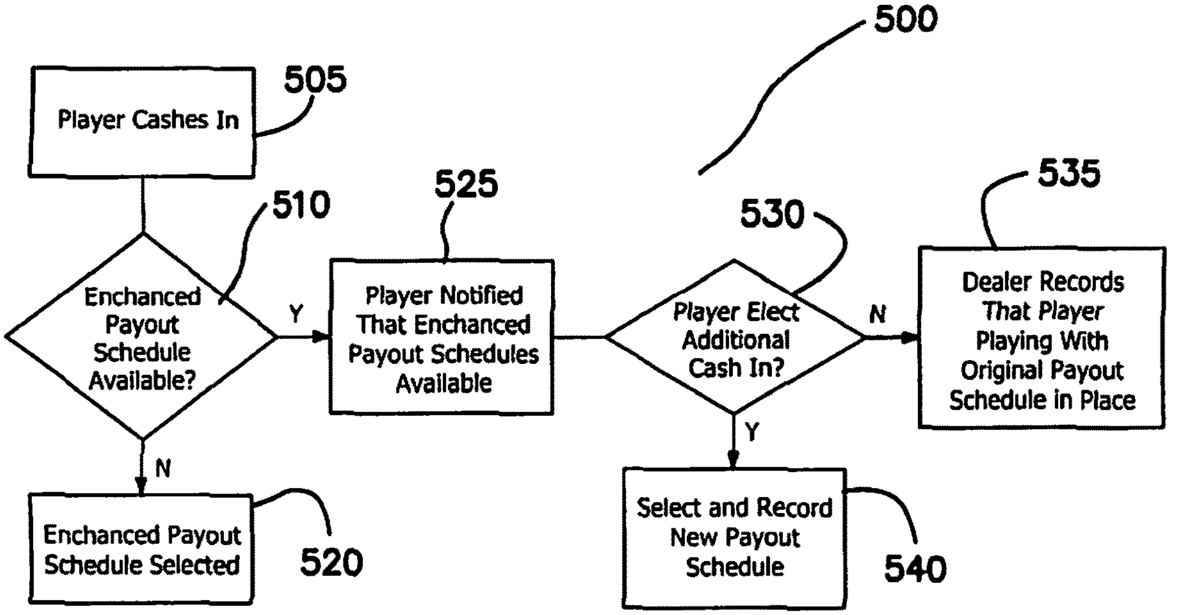

FIG. 7 shows a flow chart 500 detailing a live embodiment of the present invention. At 505, a player cashes in an amount of money. At 510, a dealer determines whether the amount cashed in entitles the player to an enhanced payout schedule. If the player has cashed-in enough to qualify for the best available payout schedule, at 520, the dealer selects and identifies, marks or otherwise maintains a record that the best payouts are being used for the player. If not, at 525, the dealer notifies the player that by cashing in more money the player will be entitled to a better payout schedule. If, at 530, the player declines to cash in additional money, at 535, the dealer selects and identifies, marks or otherwise maintains a record that the player is entitled to conventional payouts or other payouts less than the best payouts available. If, at 530, the player elects to cash in additional money, at 540, the dealer identifies, marks or otherwise maintains a record of the payout schedule to which the player is entitled.

Those skilled in the art will recognize that any game of chance, including, but not limited to craps, blackjack, keno, bingo and roulette, whether facilitated by electronic gaming machines or devices, or live games, may benefit from the embodiments of the present invention. Moreover, any slot machine can be configured to facilitate the embodiments of the present invention. The embodiments of the present invention are also suitable for online systems and server-based systems offering games of chance. With online and/or server-based systems, players access the games of chance from a remote server using a player terminal (dumb or smart), personal computer or hand-held device (e.g., cellular telephone or PDA) but the overall purpose of the embodiments of the present invention remains the same: to provide players with enhanced payout schedules for putting more money into the game.

The embodiments of the present invention benefit the player by providing enhanced payouts and provide the house or casino with a greater likelihood of winning at a higher rate because players have more money invested in the game. Even though players do not have to play all of the money initially invested or cashed in, players are more likely to play money already cashed in over money in their pockets or awaiting at the ATM or cashier.

In another embodiment of the present invention, other bonuses or awards are manipulated or enhanced based on the amount of the initial investment. Most casino resorts now provide players with comps and other amenities based on how, and how much, players play games of chance. In most instances, players accumulate player points which can be redeemed for casino amenities (e.g., food, rooms, etc.). Accordingly, with the embodiments of the present invention, such comps and other amenities may be enhanced based on the player's initial investment. For example, a player may receive double player points based on an initial investment amount exceeding a pre-established threshold amount and triple player points responsive to a larger initial investment. Comps, like free or reduced rate rooms, may also be enhanced based on the initial investment amount. Such enhancements are added to conventional awards or comps the player would conventionally receive.

In another embodiment of the present invention, if players play and lose the entire amount invested, they receive a bonus or award. In one embodiment, the bonus comprises free plays of the machine wherein the number of free plays is based on the amount of money initially invested. In other words, more free plays are provided responsive to a larger initial investment. Indeed, initial investments below a threshold amount (e.g., $50) may not be entitled to any bonus. In another embodiment, players are offered the opportunity to continue playing the gaming machine using the enhanced pay table for any additional monies deposited even if the additional amount deposited is less than the threshold amount for utilizing said enhanced pay table.

Although the invention has been described in detail with reference to several embodiments, additional variations and modifications exist within the scope and spirit of the invention as described and defined in the following claims.

The invention claimed is:

1. A method of conducting a player loyalty program to award a player of a game on a computerized platform, the method comprising the steps of:

a processor accepting an initial investment from a player to participate in said game on said computerized platform, the computerized platform being configured to use a first payout schedule and a second payout schedule to determine payouts from instances of play of a game of chance, the first payout schedule having a greater overall payout percentage than the second payout schedule, wherein any payout is distributed to a player account stored in a memory;

said processor crediting said player account on said computerized platform an amount equivalent to said initial investment;

said processor counting a number of times the first payout schedule is used to determine a payout to said player account from instances of play of the game; and responsive to the counted number of times said first payout schedule is used to determine a payout to said player account being equal to or greater than a first threshold value, said processor assigning an award for display on a display device in communication with the computerized platform; and responsive to the counted number of times said first payout schedule is used to determine a payout to said player account being less than said first threshold value, said processor using one of the first and second payout schedules to determine a payout amount to be credited to said player account from an instance of play of the game.

2. The method as recited in claim 1, wherein the award is a monetary amount.

3. The method as recited in claim 1, wherein the award is a non-monetary item.

4. The method as recited in claim 3, wherein the award is an amount of free play of the game.

5. The method as recited in claim 3, wherein the award is an amount of player loyalty program points.

6. The method as recited in claim 1, further comprising the steps of:

said processor accepting an additional investment from a player to participate in said game on said computerized platform; and said processor crediting said player account on said computerized platform an amount equivalent to said additional investment.

7. The method as recited in claim 6, further comprising the steps of: comparing the amount of the additional investment with a threshold amount; and responsive to the additional investment being greater than the threshold amount, said processor using the first payout schedule to determine a payout amount to be credited to said player account from an instance of play of the game.

8. The method as recited in claim 1, further comprising the steps of: comparing the amount of the initial investment with a threshold amount; and responsive to the initial investment being greater than the threshold amount, said processor using the first payout schedule to determine a payout amount to be credited to said player account from an instance of play of the game.

9. The method as recited in claim 1, further comprising the step of said processor receiving a first threshold value and storing said first threshold value in the memory unit.

10. The method as recited in claim 1, wherein responsive to the counted number of times said first payout schedule is used to determine a payout to said player account being less than said first threshold value, said processor using the second payout schedule to determine a payout amount to be credited to said player account from an instance of play of the game.

11. A computerized platform operatively associated with a processor, the processor being configured to execute and conduct a player loyalty program involving the provision of awards to players of a game on the computerized platform, comprising:

said processor accepting an initial investment from a player to participate in said game on said computerized platform, the computerized platform being configured to use a first payout schedule and a second payout schedule to determine payouts from instances of play of a game of chance, the first payout schedule having a greater overall payout percentage than the second payout schedule, wherein any payout is distributed to a player account stored in a memory;

said processor crediting said player's account on said computerized platform an amount equivalent to said initial investment, wherein said player's account is stored in the memory;

said processor counting a number of times the first payout schedule is used to determine a payout to said player's account stored in the memory on said computerized platform from instances of play of the game; and responsive to the counted number of times said first payout schedule is used to determine a payout to said player's account being equal to or greater than a first threshold value, said processor assigning an award for display on a display device operatively associated with the computerized platform; and responsive to the counted number of times said first payout schedule is used to determine a payout to said player's account being less than said first threshold value, said processor using one of the first and second payout schedules to determine a payout amount to be credited to said player's account from an instance of play of the game.

12. The computerized platform as recited in claim 11, further comprising an input device in communication with the computerized platform and operatively associated with the processor for receiving the initial investment.

13. The computerized platform as recited in claim 11, wherein the award comprises one or more of a monetary amount, a non-monetary item, an amount of free play of the game and player loyalty program points.

14. The computerized platform as recited in claim 11, further comprising the processor comparing the amount of the initial investment with a threshold amount; and responsive to the initial investment being greater than the threshold amount, said processor using the first payout schedule to determine a payout amount to be credited to said player's account from an instance of play of the game.

15. The computerized platform as recited in claim 11, further comprising said processor receiving a first threshold value and storing said first threshold value in the memory unit.

16. The computerized platform as recited in claim 11, wherein responsive to the counted number of times said first payout schedule is used to determine a payout to said player's account being less than said first threshold value, said processor using the second payout schedule to determine a payout amount to be credited to said player's account from an instance of play of the game.

17. A method of conducting an online player loyalty program to award a player of a game on a computerized platform in communication with the Internet, the computerized platform being operatively associated with a processor, the method comprising the steps of:

said processor accepting an initial investment from a player to participate in said game on said computerized platform, said computerized platform being configured to use at least one of a first payout schedule and a second payout schedule to determine payouts to said player's account from instances of play of the game, wherein the first payout schedule includes one or more higher payouts than one or more payouts included in the second payout schedule;

said processor crediting said player's account on said computerized platform an amount equivalent to said initial investment, wherein said player's account is stored in a memory;

said processor receiving a first threshold value associated with the amount of said initial investment credited to said player's account and storing said first threshold value in the memory;

responsive to the amount of said initial investment credited to said player's account being greater than said first threshold value, said processor using the first payout schedule to determine any payout amounts to be credited to said player's account from instances of play of the game;

said processor receiving a threshold number of times the first payout schedule is used to determine any payout amounts to be credited to said player's account and storing said first threshold number of times in the memory;

said processor counting a number of times the first payout schedule is used for said player's account;

responsive to the processor counting said count of the number of times said first payout schedule is used being less than said threshold number of times and said initial investment being exhausted, said processor assigning an award to said player's account; and responsive to the processor counting said count of the number of times said first payout schedule is used being equal to or greater than said threshold number of times, said processor using the second payout schedule to determine any payout amounts to be credited to said player's account from instances of play of the game thereafter.

18. The method as recited in claim 17, wherein the award comprises one or more of a monetary amount, a non-monetary item, an amount of free play of the game and player loyalty program points.

19. The method as recited in claim 17, further comprising the steps of:

said processor accepting an additional investment from a player to participate in said game on said computerized platform; and said processor crediting said player's account on said computerized platform an amount equivalent to said additional investment.

20. The method as recited in claim 19, wherein the amount of the additional investment is compared with the first threshold value as the initial investment.

* * * * *